Patented Nov. 20, 1923.

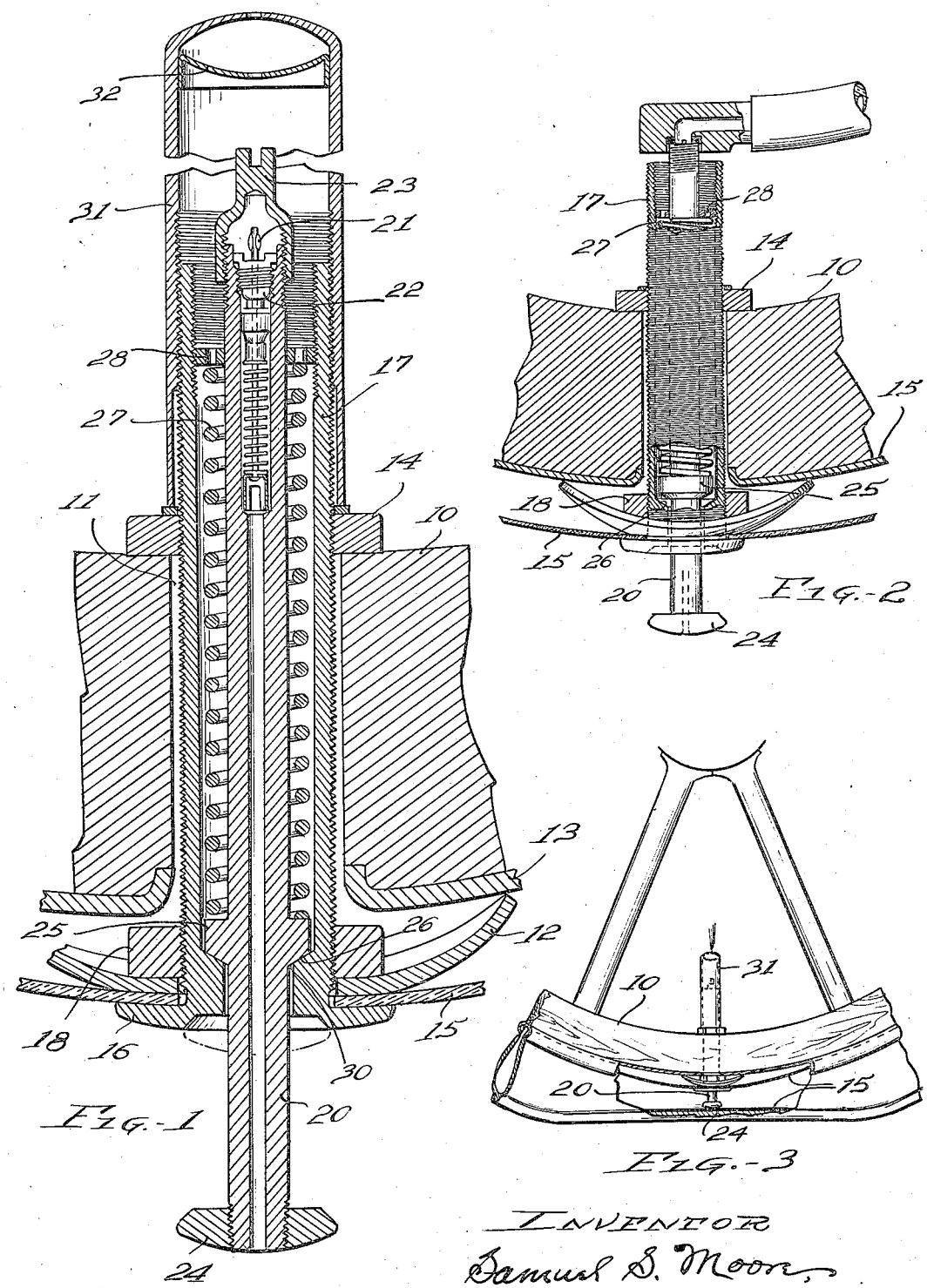

1,475,023

UNITED STATES PATENT OFFICE.

SAMUEL S. MOORE, OF CLEVELAND, OHIO, ASSIGNOR OF ONE-HALF TO RALPH D. MILLER, OF CLEVELAND, OHIO.

TIRE VALVE.

Application filed April 12, 1922. Serial No. 551,818.

*To all whom it may concern:*

Be it known that I, SAMUEL S. MOORE, a citizen of the United States, residing at Cleveland, in the county of Cuyahoga and State of Ohio, have invented a certain new and useful Improvement in a Tire Valve, of which the following is a full, clear, and exact description, reference being had to the accompanying drawings.

This invention relates to valves, particularly to those adapted for use in connection with pneumatic tires and for indicating the pressure conditions within the tire.

Numerous devices embodying a signal in connection with pneumatic valves have heretofore been constructed, but in most cases, the signals have been arranged to operate only when the pressure in the tire is decreased beyond a predetermined amount. Again, other valves have been used wherein a signal is given only when the pressure is increased beyond a predetermined amount. It is desirable however, to obtain a device which may be incorporated in a valve for a pneumatic tire and which actuates a signal not only when the pressure is diminished beyond a predetermined amount, but also when the pressure is increased beyond such amount.

One of the objects of my invention therefore, is the provision of a pneumatic valve which embodies a signal for warning an operator whenever the tire pressure is increased or diminished beyond a predetermined degree. This device is arranged to indicate pressure conditions not only when the automobile is stationary, but also while it is in operation; moreover it automatically relieves excess pressure, whether when filling the tire, or, due to heat, while running.

In carrying out my invention, I provide a valve stem housing which is adapted to seat against a surrounding outer casing, and to be held thereagainst so as to form an auxiliary air valve by a strong compression spring. The housing extends beyond the inner wall of the tube and is adapted to be moved axially against a strong compression spring for allowing air to escape from the tube. This occurs whenever the pneumatic pressure is greater than the force exerted by the compression spring, or whenever the projecting end of the housing is forced inwardly by contact with a partially deflated tire. In either case, the escaping air is adapted to actuate a whistle.

The means for carrying out my invention will be more fully set forth, in connection with the following description which pertains to the accompanying drawings and the essential features of my invention will be summarized in the claims.

In the drawings, Fig. 1 is a section on an enlarged scale through a motor vehicle wheel having a pneumatic valve embodying my invention attached thereto; Fig. 2 is a similar section on a reduced scale showing the action of the pneumatic release when the tire is being inflated; and Fig. 3 is a fragmentary view of a portion of the valve showing the operation thereof when the tire is deflated while in use.

My invention is broadly concerned with the construction of a device wherein an indication is given whenever the pressure within the pneumatic valve is increased or diminished beyond a predetermined amount. Accordingly, in the various figures, I have shown a wheel 10 having an opening 11 for receiving the usual pneumatic valve. The valve casing is shown as being held in place by a flanged member 12 which is adapted to abut a rim 13, and by a nut 14 which abuts the felly of the wheel 10. A tube 15 is arranged to be held between a flange 16, which may form an integral part of the casing 17, and a flanged member 12, by means of a nut 18 which is threaded onto the casing.

In the embodiment shown my invention comprises a casing 17, and a valve stem housing 20 which is movable relatively thereto. The housing carries the usual valve stem 21, and valve seat 22, and is adapted to be closed at the outer end by the customary cap 23. The housing 20 extends beyond the flanged portion 16 of the casing, and is provided with an abutment piece 24 which is adapted to be engaged by the outer wall of the tire when the tire is partially deflated as shown in Fig. 3. The housing and casing form an air-tight joint as illustrated by the enlarged portion 25 on the housing, with the cooperating shoulder 26 on the casing. This in effect is an auxiliary air valve which is normally held in closed position by a strong compression spring 27, one end of which engages the top of the enlarged portion 25 and the other end of which is adapted to engage an adjustable plate 28 in threaded engagement with the interior of the casing. The spring 27 may be set by adjusting the plate 28 so as to hold the axiliary valve closed, until the pressure in the tire reaches a predetermined amount. This is usually governed by the size of the tire to which the device is attached. Further, by making the housing of one piece construction, the device may be satisfactorily used when the tire is partially deflated or even totally deflated, without endangering the parts, as by bending or shearing any of the movable elements, when the abutment piece is forced inwardly by contact with the outer wall of the tire.

The operation of a device constructed according to my invention is as follows:—Assuming that a tire is being inflated as shown in Fig. 2, then, as the pressure is increased in the tire, the auxiliary valve 25 remains closed until the pneumatic pressure exerted on the unbalanced portion 30 of the valve 25 is greater than the force exerted by the spring 27. Then, when this unbalanced pressure overcomes the force of the spring, the housing 20 is forced inwardly and air is permitted to escape into the chamber between the housing and casing. Since the plate 28 is perforated, the excess air passes through the plate and out the top of the casing. This is shown by the arrows in Fig. 2. The operator then, is warned of excessive pressure in the tube during the filling operation. Again, the tire is protected against inadvertent increase of pressure within the tires in case they are inflated at service stations, where the pressure carried is usually far in excess of that required for the average tire.

After the tire has been inflated, and the dust cap 31 is placed over the casing, then, if the pressure within the tire should be materially increased while the vehicle is in use, the housing will again be forced inwardly against the spring 27, thus allowing excess air to escape through the passages heretofore mentioned. As a means for warning a driver, I employ a whistle 32 which is arranged to be actuated by the escaping air. In the drawing, this whistle is shown as carried by the dust cap, though it may be independently supported by the casing.

Similarly, if the tire should be deflated while in use, the housing 20 is adapted to be moved inwardly whenever a portion of the tire adjacent the valve comes into contact with the ground as shown in Fig. 3. Normally, the abutment piece 24 is out of contact with the wall of the tire, and when the pressure is reduced to a predetermined amount, the wall of the tire engages the abutment piece, thus forcing the housing inwardly and again opening the auxiliary valve. Here too, the whistle is sounded by the escaping air and the driver is warned before any serious damage occurs to the tire.

From the foregoing description, it will be seen that my invention provides a device which embodies a signal for indicating not only the excess of pressure, but also insufficient pressure within a pneumatic tire. The accomplishment of the two-fold purpose is attained within a comparatively small space and without employing pivoted or hinged members which are apt to break whenever the weight of the vehicle presses the wall of the deflated tire inwardly against such member. Further the construction is quite simple and of rugged character and is well adapted for use in existing pneumatic tires.

Having thus described my invention, I claim:

1. In a device of the character described, the combination with a tire, of a pneumatic valve therefor, a signal associated with said valve, mechanically actuated means for operating the signal upon under-inflation of the tire, and pneumatically actuated means for operating the signal upon over-inflation of the tire.

2. A device of the character described, comprising in combination a vehicle wheel having an opening through the felloe thereof, a pneumatic valve associated with the opening, a casing extending through the opening and enclosing the valve, a member movable relatively to the casing and extending within the tire, a signal, and a spring associated with the casing for positioning said member whereby contact between the portion of said member and tire operates said signal upon under-inflation and whereby excessive pressure within the tire acts against said spring to operate the signal upon over-inflation of the tire.

3. A device of the character described comprising in combination a pneumatic valve, a movable housing therefor, an auxiliary valve controlled by movement of the housing, a casing forming a seat for the auxiliary valve, a spring associated with the housing for normally holding the auxiliary valve in closed position, and means controlled by said auxiliary valve for indicating excessive pressure or insufficient pressure in the tire.

4. A device of the character described comprising in combination a pneumatic valve, a movable housing therefor adapted to be moved either mechanically or pneumatically, a casing surrounding the housing, the casing and housing forming an auxiliary valve, means for normally holding the auxiliary valve in closed position, and a signal controlled by movement of said housing for indicating excessive pressure and insufficient pressure in a tire.

5. In combination, a tire, a pneumatic valve, a housing therefor, a casing, an auxiliary valve formed by the housing and casing, a spring tending to seat the auxiliary valve, said auxiliary valve being opened mechanically for under-inflation of the tire and pneumatically for over-inflation of the tire, and an alarm controlled by the auxiliary valve.

6. In combination, a pneumatic tire, a valve therefor, a housing associated with the valve, a casing surrounding the housing and adapted to be secured to a tire, said housing being longitudinally movable relative to the casing and cooperating therewith to form an auxiliary valve, a spring tending to hold the auxiliary valve in closed position, said auxiliary valve being opened mechanically upon under inflation of the tire and opened pneumatically upon over-inflation, and an alarm controlled by the auxiliary valve.

7. In combination, a pneumatic valve, a movable housing therefor, a casing surrounding the housing and provided with means for securing it to a tire tube and having means thereon for limiting the movement of the housing relatively thereto, and means associated with the housing for normally holding it in engagement with the casing to form an air tight valve, and means actuated by the air passing through said valve upon movement of the housing for indicating excessive pressure or insufficient pressure in a pneumatic tire.

8. In a device of the class described, the combination with a tire, of a pneumatic valve therefor, a housing associated with the valve, a casing enclosing the housing, an auxiliary valve formed by the casing and housing, a spring tending to hold the housing and casing in engagement with each other, a member within the tire adapted to engage the inner wall thereof upon under inflation of the tire, a passageway associated with the auxiliary valve and communicating with the interior of the tire whereby the valve is pneumatically opened upon over inflation of the tire, and a pneumatic alarm rendered active by the opening of the auxiliary valve.

9. In combination, a pneumatic tire, a valve therefor, a tubular housing enclosing the valve, a casing surrounding the housing, said casing having a valve seat and said housing being adapted to cooperate therewith to form an auxiliary valve, a spring tending to hold the valve in closed position, a passageway leading from one side of the valve to the interior of the casing whereby over inflation of the tire pneumatically opens said auxiliary valve, and a pneumatic alarm adapted to be actuated by the pressure within the tire when the auxiliary valve is open.

10. The combination with a tire and a pneumatic valve and a housing therefor operating to control the normal filling of the tire, of a casing surrounding the housing and forming an auxiliary valve therewith, yieldable means for normally holding said auxiliary valve closed, means whereby said auxiliary valve may be opened and a signal adapted to be actuated by escape of air whenever the auxiliary valve is opened.

11. In combination, a pneumatic tube, a valve therefor, a housing for said valve, a casing surrounding the housing and forming an auxiliary valve therewith, said housing projecting beyond one end of the casing and into a tube, means for normally holding said auxiliary valve in closed position, means whereby excessive pneumatic pressure in the tube, or mechanical pressure of the tube against the inner end of the housing, opens the auxiliary valve, and a signal actuated by the escaping air through the auxiliary valve.

12. In combination, a pneumatic valve, a housing therefor, said housing comprising a one piece member having a portion thereof extending into a tire tube, a casing surrounding the housing and forming an auxiliary valve therewith and attached to said tube, a spring surrounding the housing for normally holding said auxiliary valve in closed position, a perforated plate for adjusting the tension of the spring, a dust cap in engagement with the casing, and an audible signal actuated by air flowing through the auxiliary valve.

13. In a device of the class described, the combination with a pneumatic valve, of a housing therefor, said housing comprising a one piece member having an enlarged portion thereon, a casing surrounding the housing and having a shoulder thereon, said enlarged portion and shoulder forming an auxiliary valve, yieldable means for normally holding said valve in closed position, said housing having a portion thereof extending into a pneumatic tube but terminating short of the outer wall thereof, means whereby contact between the wall of the tube and the projecting portion of said member opens said auxiliary valve, said auxiliary valve being also adapted to be opened by excessive pressure in the tube, a dust cap carried by the casing, and a signal actuated by air escaping through the auxiliary valve.

14. In combination, a pneumatic valve, a tubular housing therefor, said housing having a portion thereof extending into a tire tube, whereby it may be moved when the tube becomes deflated, a casing surrounding the housing and having a valve seat, said casing being attached to the tire tube, the housing being slidable through the casing and having an annular enlargement cooperating with said valve seat, a spring surrounding the housing and tending to force the enlargement thereof into engagement with said valve seat, and a signal actuated by the escape of air through the auxiliary valve.

15. In combination, a pneumatic valve, a tubular housing carrying it, a tubular casing enclosing the housing and adapted to extend through the felly of a wheel, a tire tube to which the inner end of the casing is secured, said housing being movable relatively to the casing and cooperating therewith to provide an auxiliary valve, yieldable means for holding said auxiliary valve in closed position, a dust cap embracing the casing and secured to it, and an audible signal within the dust cap adapted to be actuated by the escape of air through said auxiliary valve.

In testimony whereof, I hereunto affix my signature.

SAMUEL S. MOORE.